United States Patent
Seo et al.

(10) Patent No.: US 7,612,830 B2
(45) Date of Patent: Nov. 3, 2009

(54) APPARATUS AND METHOD FOR EXTRACTING ASPECT RATIO OF RECEIVED BROADCAST CONTENT

(75) Inventors: Jang-seok Seo, Seoul (KR); Sung-hwan Min, Seoul (KR); Young-ki Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 11/333,349

(22) Filed: Jan. 18, 2006

(65) Prior Publication Data

US 2006/0158555 A1 Jul. 20, 2006

(30) Foreign Application Priority Data

Jan. 19, 2005 (KR) .................... 10-2005-0005043

(51) Int. Cl.
*H04N 5/46* (2006.01)
(52) U.S. Cl. ...................... 348/556; 348/558
(58) Field of Classification Search ......... 348/554–558, 348/913; *H04N 5/46, 3/27*
See application file for complete search history.

(56) References Cited

U.S. PATENT DOCUMENTS

| | | | |
|---|---|---|---|
| 5,657,034 A | 8/1997 | Yamazaki | |
| 5,719,636 A * | 2/1998 | Ishii et al. | 348/558 |
| 5,973,749 A * | 10/1999 | Ishii et al. | 348/558 |
| 7,187,415 B2 * | 3/2007 | Arora | 348/556 |

FOREIGN PATENT DOCUMENTS

| | | |
|---|---|---|
| JP | 5-292424 A | 11/1993 |
| JP | 2001-251591 A | 9/2001 |
| KR | 1994-0017843 A | 7/1994 |
| KR | 100192701 | 3/1996 |
| KR | 1997-7004293 A | 8/1997 |
| KR | 2000-0034341 A | 6/2000 |

\* cited by examiner

*Primary Examiner*—Sherrie Hsia
(74) *Attorney, Agent, or Firm*—Sughrue Mion, PLLC

(57) ABSTRACT

Disclosed herein are an apparatus and method for extracting the aspect ratio of received broadcast content. The apparatus includes an image reception unit, a frequency detection unit, a determination unit, and an output unit. The image reception unit receives a digital image. The frequency detection unit detects the frequency of the predetermined region of the frame of the digital image. The determination unit determines the aspect ratio of the received digital image by comparing the detected frequency with a threshold value. The output unit outputs the aspect ratio of the received digital image based on the result of the determination.

17 Claims, 7 Drawing Sheets

4:3

16:9

16:9

16:9

16:9

APPARATUS AND METHOD FOR EXTRACTING ASPECT RATIO OF RECEIVED BROADCAST CONTENT

CROSS-REFERENCE TO RELATED APPLICATION

This application claims priority from Korean Patent Application No. 10-2005-0005043 filed on Jan. 19, 2005, in the Korean Intellectual Property Office, the disclosure of which is incorporated herein by reference in its entirety.

BACKGROUND OF THE INVENTION

1. Field of the Invention

The present invention relates generally to an apparatus and method for extracting the aspect ratio of received broadcast content and, more particularly, to an apparatus and method for extracting the aspect ratio of received broadcast content, which analyze the frequency of the image of the broadcast content received from a digital broadcasting station, compare the analyzed frequency with a preset threshold value, and extract the aspect ratio of the image, thus enabling the image to be displayed in conformity with the extracted aspect ratio.

2. Description of the Related Art

Standards by which broadcasting stations transmit analog broadcast content include the National Television System Committee (NTSC) standard, the Phase Alternation Line (PAL) standard, and the Sequentiel Couleur Avec Memoire (SECAM) standard.

The NTSC standard is a color Television (TV) broadcasting standard that is used in the U.S., Canada, Mexico, Japan, South Korea, etc. In this standard, the number of scanning lines is 525, and the number of frames transmitted per second is 30.

The PAL standard is a broadcasting standard that is used in Europe, Australia, China, North Korea, etc. In this standard, the number of scanning lines is 625, and the number of frames transmitted per second is 30. This standard is advantageous in that it is not affected by phase distortion that is generated on a transmission path.

The SECAM standard is a broadcasting standard in which color difference signals are sequentially alternated on alternate scanning lines. This standard does not have the disadvantage of image distortion due to frequency and amplitude, but has the disadvantage of degraded vertical resolution.

As described above, the conventional analog TV broadcasting standards used in the world differ in the number of scanning lines, the number of frames transmitted per second, the modulation scheme, the bandwidth of a channel, the bandwidth of an image signal and audio channel modulation. In order to view foreign broadcasts based on a different broadcasting standard, a separate conversion device is required.

Meanwhile, there is digital TV (high definition television) technology that provides image quality similar to that of 35 mm movies and sound quality similar to that of Compact Disks (DCs). The digital TV technology is the technology of transmitting and displaying digital signals instead of analog signals, where the digital signals are compressed and transmitted using Moving Picture Experts Group (MPEG)-2 technology.

As described above, digital TV technology-based broadcasting is the digital broadcasting technology of processing digitized data. A digital TV includes a module for receiving data from digital broadcasting stations and processing the data, and a display window for displaying the processed data.

The principal difference between analog broadcasting and digital broadcasting is the difference in data format. Since digital broadcasting has no noise and distortion caused by the reflection of analog waves, it can reconstruct high-quality image and audio data and provide bi-directional service, not unidirectional service.

Furthermore, the digital broadcasting has an aspect ratio of 16:9 in consideration of the fact that human's eyes are more sensitive to lateral directions than to vertical directions. This ratio, that is, 16:9, is higher than the aspect ratio of the conventional analog broadcasting, that is, 4:3. Accordingly, viewers are under the illusion that they are provided with a screen wider than an actual screen.

Digital TV technology, that is, digital broadcasting, that provides image quality five times as high as that of conventional analog broadcasting is currently provided in some areas and coexists with analog broadcasting. However, the territory covered by digital broadcasting is continuously expanding.

Meanwhile, due to the coexistence of digital broadcasting with analog broadcasting, digital broadcasting stations transmit both High Definition (HD)-grade digital broadcasts having an aspect ratio of 16:9 and digital broadcasts having an aspect ratio of 4:3 when transmitting broadcast content.

The Standard Definition (SD)-grade digital broadcasts transmitted by the digital broadcasting stations have a digital format, into which analog broadcast data are converted, and an aspect ratio of 16:9, to which the analog broadcasts are extended.

Through a process of extending the aspect ratio of 4:3 to the aspect ratio of 16:9, images having an aspect ratio wider in a lateral direction than that of the original images are output.

FIG. 1 is a diagram illustrating the aspect ratios of a conventional analog broadcast and a digital broadcast.

As illustrated in the drawing, the aspect ratio of a conventional analog TV 11 is 4:3, whereas the aspect ratio of an HD-grade digital TV 12 is 16:9.

In this case, the resolution of the analog TV 11 is about 0.4 million pixels while the resolution of the HD-grade digital TV 12 is about 2 million pixels, so that the digital TV 12 has a resolution five times as high as that of the analog TV 11.

As shown in the drawing, when an HD-grade digital broadcast is displayed through the analog TV 11, an image is displayed with the sides thereof being eliminated due to the aspect ratio thereof.

FIG. 2 is a diagram illustrating a method of displaying a conventional analog broadcast on a digital TV.

Methods of displaying an analog broadcast having an aspect ratio of 4:3 on a digital TV using a display window having an aspect ratio of 16:9 include an up-scale scheme 21 and a crop scheme 22.

The up-scale scheme 21 is a method of extending an aspect ratio of 4:3 to an aspect ratio of 16:9, in which case an image stretched in a lateral direction is displayed due to the extension of the aspect ratio. Furthermore, since the analog TV has a resolution lower than that of the digital TV, digital image interpolation is performed to meet the resolution of the digital TV.

The crop scheme 22 is a method of displaying an image on a digital TV while maintaining an aspect ratio of 4:3, in which only digital image interpolation is performed, so that vacant spaces are produced on both sides of the display window of the digital TV having an aspect ratio of 16:9.

FIG. 3 is a diagram illustrating a method of displaying a digital broadcast on a conventional digital TV in the aspect ratio of digital broadcast.

A digital TV, having received an HD-grade digital broadcast, displays the digital broadcast having an aspect ratio of 16:9 in a display window. However, when the aspect ratio is set to 4:3, the digital broadcast is displayed in the set aspect ratio, in which case the above-described crop scheme is employed. Accordingly, the digital broadcast that is displayed in an aspect ratio of 16:9 is displayed in a form where images are vertically stretched (refer to reference numeral 31).

Accordingly, the users of digital TVs suffer inconvenience in that they must switch settings according to the aspect ratio of received broadcast content.

Moreover, there is no information about the aspect ratio in packets that are transmitted from a digital broadcasting station, so that it is difficult for a digital TV to automatically make settings.

Japanese Unexamined Pat. Pub. No. H05-292424 discloses an apparatus for receiving TV signals based on the NTSC standard, the EDTV standard and the digital TV standard and displaying broadcast content to meet respective standards. This invention supports only screen output, and provides no appropriate measure for dealing with aspect ratios.

SUMMARY OF THE INVENTION

Accordingly, the present invention has been made keeping in mind the above problems occurring in the prior art, and an aspect of the present invention is to provide an apparatus and method that extract the aspect ratio of received digital broadcast content by analyzing the frequency of the specific region of the broadcast content received from a digital broadcasting station and comparing the analyzed frequency with a preset threshold value.

Another aspect of the present invention is to provide an apparatus and method that extract the aspect ratio of received broadcast content by analyzing characters that are represented in an image and are located in the specific region of the received broadcast content.

Aspects of the present invention are not limited to the above-described objects, and other aspects not described above can be clearly understood from the following description by those skilled in the art.

In order to accomplish the above aspects, an embodiment of the present invention provides an apparatus for extracting an aspect ratio of received digital content, the apparatus including an image reception unit for receiving a digital image; a frequency detection unit for detecting the frequency of the predetermined region of the frame of the digital image; a determination unit for determining the aspect ratio of the received digital image by comparing the detected frequency with a threshold value; and an output unit for outputting the aspect ratio of the received digital image based on the result of the determination.

Additionally, an embodiment of the present invention provides a method of extracting the aspect ratio of received digital content, the method including the steps of receiving a digital image; detecting the frequency of the predetermined region of the frame of the received digital image; determining the aspect ratio of the received digital image by comparing the detected frequency with a predetermined threshold value; and outputting the aspect ratio of the digital image based on the result of the determination.

Details of other embodiments are included in the following detailed description and the accompanying drawings.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE EXEMPLARY EMBODIMENTS

Figure 1:
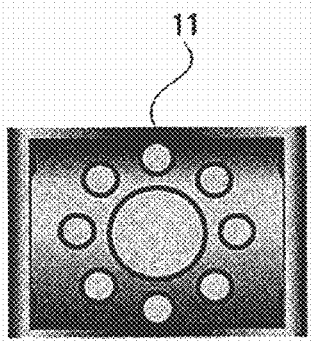
FIG. 1 is a diagram illustrating the aspect ratios of a conventional analog broadcast and a digital broadcast.
Figure 1:
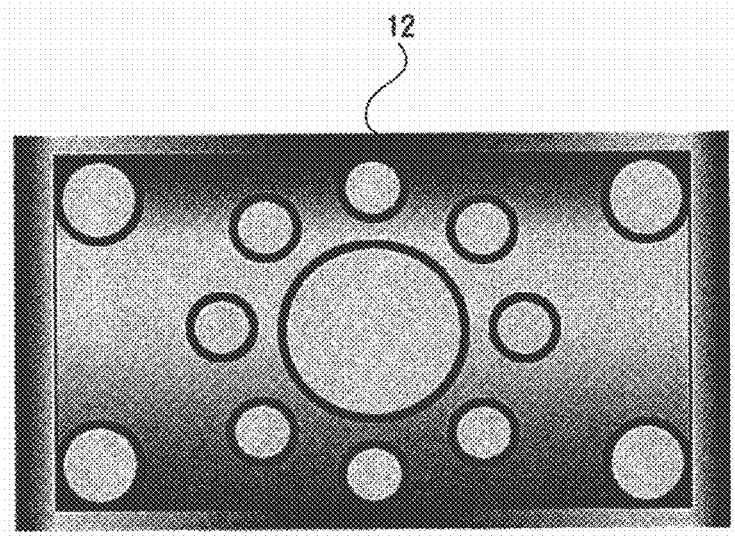
Figure 2:
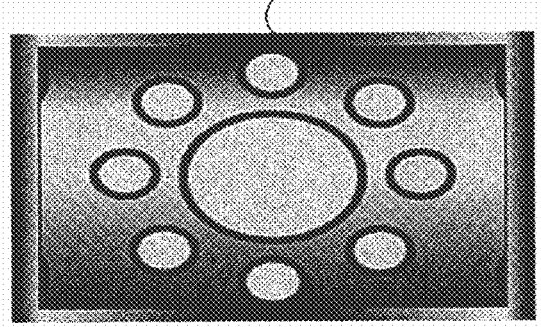
FIG. 2 is a diagram illustrating a method of displaying a conventional analog broadcast on a digital TV.
Figure 2:
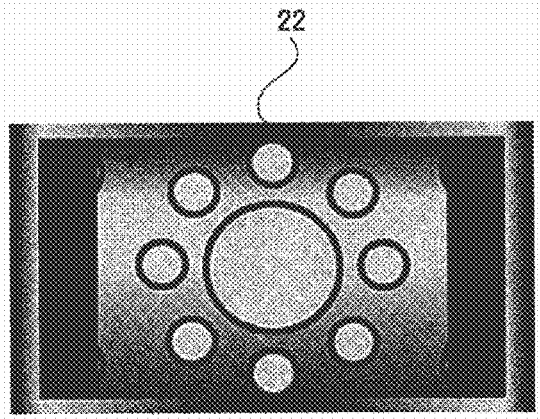
Figure 3:
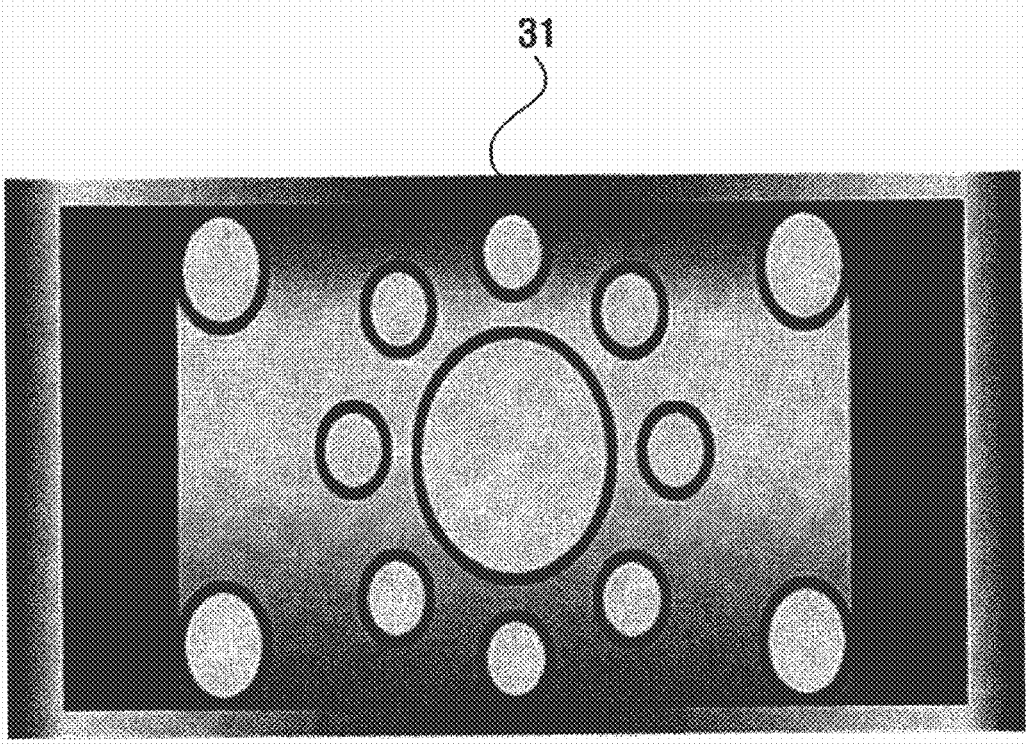
FIG. 3 is a diagram illustrating a method of displaying a digital broadcast on a conventional digital TV in the aspect ratio of digital broadcast.

Reference now should be made to the drawings, in which the same reference numerals are used throughout the different drawings to designate the same or similar components.

With reference to the accompanying drawings, exemplary embodiments of the present invention are described in detail below.

Figure 4:
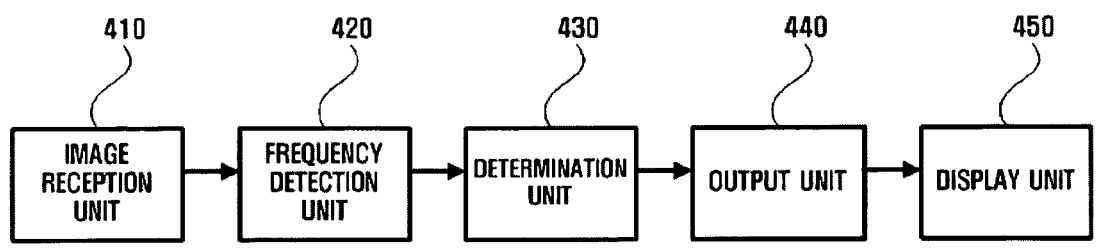
FIG. 4 is a block diagram illustrating an apparatus for extracting the aspect ratio of received broadcast content in accordance with an embodiment of the present invention.

FIG. 4 is a block diagram illustrating an apparatus for extracting the aspect ratio of received broadcast content in accordance with an embodiment of the present invention.

The apparatus in accordance with this embodiment for extracting the aspect ratio of received broadcast content includes a digital broadcasting reception set-top box or digital TV, and functions to detect the frequency of a specific region of a received digital image and output an aspect ratio using the detected frequency. The extracted aspect ratio is transferred to a display unit 450 or separate display unit 450, and the display unit 450 displays the received digital image according to the transferred aspect ratio.

The apparatus for extracting the aspect ratio of the received broadcast content includes an image reception unit 410, a frequency detection unit 420, a determination unit 430, an output unit 440 and a display unit 450.

The image reception unit 410 functions to receive digital images. The received digital image may be a decoded image, that is, a decompressed image.

The image reception unit 410 extracts a specific region from an arbitrary frame of a received digital image and transfers the extracted specific region to the frequency detection unit 420.

The frequency detection unit 420 functions to detect a frequency of the selected specific region of the arbitrary frame of the digital image received from the image reception unit 410.

When transmitting digital broadcast content, a digital broadcasting station produces digital broadcast content having an aspect ratio of 16:9 and a resolution of 1920×1080, and transmits the digital broadcast to users. In contrast, when analog broadcast content is transmitted, the analog broadcast content is converted into digital broadcast content and the aspect ratio thereof is converted into an aspect ratio of 16:9. In this process, an original aspect ratio of 4:3 is converted into an aspect ratio of 16:9, so that an image is stretched in a lateral direction and the resolution thereof is increased five times.

In the above-described process, in order to increase digital image resolution, digital image interpolation is performed. Digital image interpolation methods include Linear Interpolation (LI), Nearest Neighbor Interpolation (NNI), Cubic Interpolation (CI), etc. Various digital image interpolation methods other than the above-described methods exist, and can be selectively used depending on the performance of a conversion device and the type of content. However, regardless of a method used to stretch a digital image, the frequency of a stretched image is lower than the frequency of an original digital image. This will be described in detail later with reference to FIG. 5.

There are a variety of methods by which the frequency detection unit 420 detects the frequency of a digital image. In an embodiment of the present invention, a frequency is detected by accumulating the edge detection values of a specific region.

The method of detecting a frequency by accumulating edge detection values is a method that is adopted to reduce operation times. Fourier Fast Transform (FFT), Wavelet, or the like is used, depending on the operation capacity of the apparatus.

The determination unit 430 functions to determine the aspect ratio of a received digital image by comparing a frequency, which is detected by the frequency detection unit 420, with a preset threshold value.

Edge detection values are detected by the frequency detection unit 420 and accumulated. The determination unit 430 determines the aspect ratio of a digital image by comparing the accumulative edge detection value with a predetermined threshold value. When the accumulative edge detection value is lower than the threshold value, the aspect ratio is determined to be 4:3; when the accumulative edge detection value is higher than the threshold value, the aspect ratio is determined to be 16:9.

At that time, an accumulative value for at least one of horizontal, vertical and diagonal edges may be compared with the threshold value. If needed, separate threshold values may be set for respective edges.

The output unit 440 functions to output the aspect ratio of the digital image based on the result of the determination of the determination unit 430.

The aspect ratio output by the output unit 440 is transferred to the display unit 450, and the received digital image is displayed in the output aspect ratio. The output unit 440 notifies the display unit 450 of the aspect ratio by transmitting an electric signal, or a packet including the aspect ratio.

The specific region of the digital image transferred to the frequency detection unit 420 by the image reception unit 410 may be the entire selected frame. In order to increase detection efficiency achieved by the frequency detection unit 420, the entire frame may be transferred. The size of the specific region may be determined depending on the operation capacity of the frequency detection unit 420.

Meanwhile, the aspect ratio may be manually determined by the user. In which case frequency detection may be suspended for a channel for which an aspect ratio has been manually set. Furthermore, for a channel for which the aspect ratio has been set by frequency detection, the aspect ratio for the channel may be stored in a certain storage means and further frequency detection need not be performed. In this case, when a channel is selected, an aspect ratio for the channel is determined with reference to aspect ratios stored in the storage means and matched to channels first, and frequency detection is performed only when the storage means does not have an aspect ratio that matches the selected channel.

Furthermore, the aspect ratio is stored until the time for the termination of a program in a storage means using Electronic Programming Guide (EPG) data for the channel for which the aspect ratio has been determined, and the aspect ratio is eliminated from the storage means after the termination time of the program.

Figure 5:
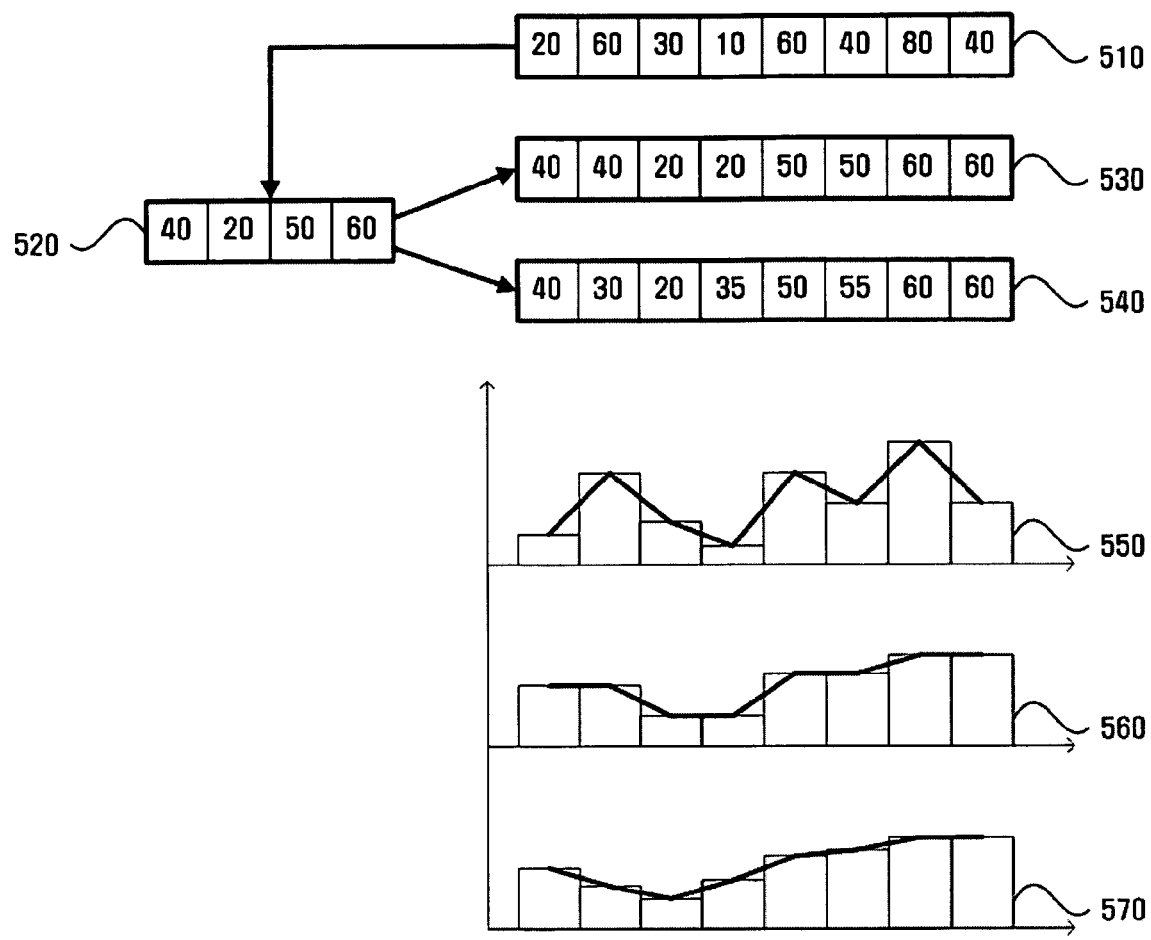
FIG. 5 is a view illustrating an example of the comparison between the frequencies of a digital broadcasts and extended analog broadcasts in accordance with an embodiment of the present invention.

FIG. 5 is a view illustrating an example of the comparison between the frequencies of a digital broadcast and extended analog broadcasts in accordance with an embodiment of the present invention.

An HD-grade digital image has a resolution of about 2 million pixels, whereas an analog image or SD-grade digital image has a resolution of about 0.4 million pixels. Accordingly, the HD-grade digital image has a resolution five times as high as that of the analog image or SD-GRADE digital image.

The digital broadcasting station transmits HD-grade digital image content and analog image content in the same image format, that is, the MPEG-2 format. The digital broadcasting station transmits the analog image content after converting it into an SD-grade digital image.

At that time, since information about the HD-grade digital image is included in the header of the converted digital image and the aspect ratio is also converted into an HD-grade aspect ratio, that is, 16:9, a screen the width of which has been extended is displayed on the display unit of the user.

Accordingly, a user side device can be aware of an aspect ratio only through a received digital image, which is a clue used in the determination of whether an original image was an HD-grade digital image or analog image.

The drawing shows a part 510 of an HD-grade digital image and a corresponding analog image 520.

For reference, an image is one-dimensionally illustrated for ease of understanding even though an actual image is two-dimensional, and it is assumed that the ratio of the width of the HD-grade digital image to the width of the analog image is 2:1. Furthermore, a method of converting an HD-grade digital image into an analog image is based on the assumption that the average values of adjacent pixels are the values of the converted analog image.

Under the above-described assumption, methods of converting the created analog image 520 into the HD-grade image are exemplified by NNI and LI. An image 530 acquired through conversion using NNI is achieved by filling the spaces between the pixels of the analog image 520 with copied pixels. Furthermore, an image 540 acquired through conversion using LI is achieved by filling the spaces between the pixels of the analog image 520 with the average values of adjacent pixels. At this time, it is assumed that the value of the last pixel of the image acquired through LI is identical to that of the previous pixel, that is, the 7th pixel.

From graphs 550, 560 and 570 for the HD-grade digital image 510 and the converted analog images 530 and 540, respectively, it can be understood that frequencies are different from each other. In more detail, it can be understood that the frequencies 560 and 570 of the converted analog images are lower than the frequency 550 of the HD-grade digital image.

The difference in frequency becomes more distinct as the frequency 550 of the HD-grade digital image increases higher. When the value between the frequency 550 of the HD-grade digital image and the frequencies 560 and 570 of the converted analog images is set as a threshold value and the threshold value is compared with the frequencies 550, 560 and 570, it can be determined whether the original image was an HD-grade digital image or an analog image, and the aspect ratio can be determined based on the result of the determination.

Meanwhile, there is a problem when the screen of an HD-grade digital image is composed of low frequencies. For example, when the difference between adjacent pixels is low as in the image of a sea or desert, there is a possibility that a detected frequency is lower than the threshold value, thus resulting in the erroneous determination of the aspect ratio.

Accordingly, frequency detection may be performed at regular intervals or the location of the specific region may arbitrarily vary. Furthermore, in this embodiment the period of frequency detection may be less than one minute. After detection has been performed a predetermined number of times, the aspect ratio may be determined based on the detected frequencies and the frequency detection may be stopped.

Figure 6:
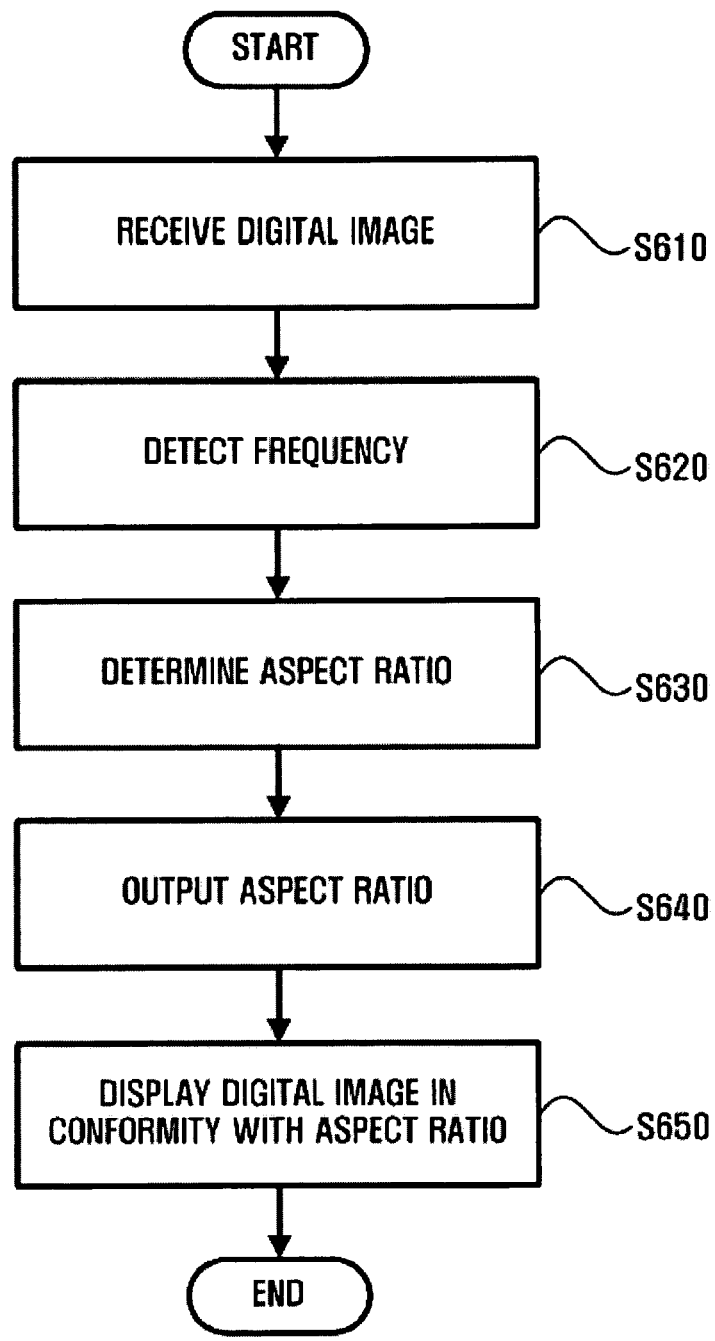
FIG. 6 is a flowchart illustrating a process of extracting the aspect ratio of received broadcast content in accordance with an embodiment of the present invention.

FIG. 6 is a flowchart illustrating a process of extracting the aspect ratio of received broadcast content in accordance with an embodiment of the present invention.

An apparatus, such as a set-top box or digital TV, that outputs the aspect ratio of received broadcast content receives an MPEG-2 format digital image from a digital broadcasting station, separates an image and voice from each other, and decodes a compressed image.

The image reception unit 410 receives a decoded digital image at step S610, and transfers a specific region, which is selected from the arbitrary one of the frames of the received digital image, to the frequency detection unit 420.

The frequency detection unit 420 detects the frequency of the specific region received from the image reception unit 410, at step S620.

The frequency detection may be performed through the accumulation of the edge detection values of the specific region. FFT or Wavelet may be employed depending on the operation capacity of the apparatus.

Furthermore, the detection of the frequency of the entire frame rather than the detection of the frequency of a specific region of the frame is more effective in determining the aspect ratio, so that the size of the specific region of the frame is large in consideration of the performance of an apparatus. Thus, frequency detection on the entire frame may be performed.

The frequency detected by the frequency detection unit 420 is transferred to the determination unit 430, and the determination unit 430 determines the aspect ratio of the received digital image by comparing the detected frequency with the predetermined threshold value at step S630.

When the detected frequency is lower than the threshold value, the aspect ratio is determined to be 4:3; when the detected frequency is higher than the threshold value, the aspect ratio is determined to be 16:9. Thus, an appropriate value between the frequency of the HD-grade digital image and the frequencies 560 and 570 of the extended analog images may be selected as the threshold value, as illustrated using FIG. 5.

The determined aspect ratio is output through the output unit 440. The output unit 440 outputs the aspect ratio in the form of an electric signal or a packet including the aspect ratio at step S640.

The output aspect ratio is transferred to a display unit 450, which is provided in the apparatus, or separate display unit 450. The display unit 450 displays the digital image, which has been received and decoded by the apparatus, in compliance with the transferred aspect ratio at step S650.

Figure 7A:
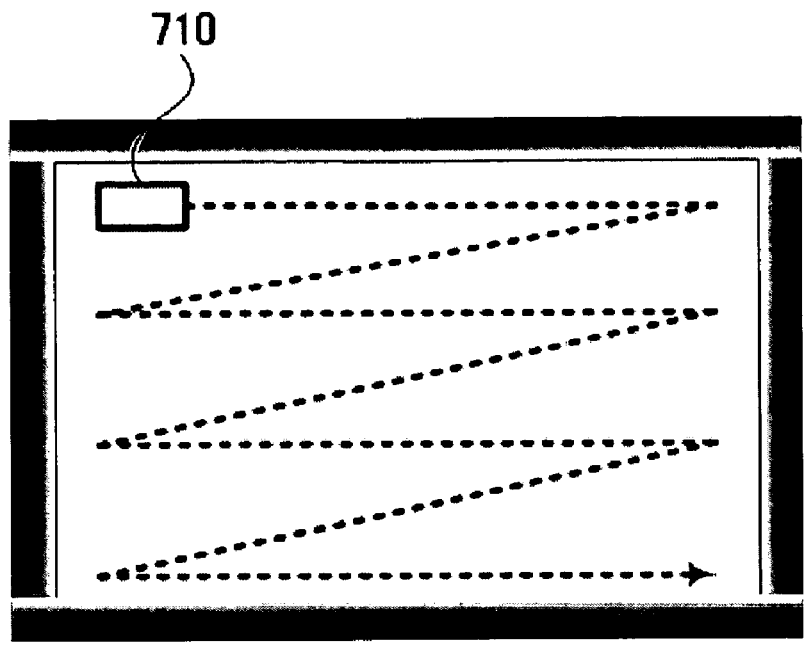
FIG. 7a is a view illustrating a process of scanning an arbitrary frame and finding a specific region having a highest frequency in accordance with an embodiment of the present invention.

FIG. 7a is a view illustrating a process wherein the image reception unit 410 extracts a specific region by scanning an arbitrary frame and finding a specific region having a highest frequency in accordance with an embodiment of the present invention.

As described above, when frequency detection is performed on a frame of an image, such as a sea or desert, even in an HD-grade digital image, there is a strong possibility that a low frequency will be detected. As a result, an error in the extraction of the aspect ratio may occur.

This results from the fact that the frequency is extracted from the low frequency region of the original frame. If frequency detection is performed on the highest frequency region of an arbitrary region, a possibility of such an error can be reduced.

A specific region having the highest frequency can be extracted by scanning the entire frame using a window 710 having a size identical to that of the specific region, as shown in FIG. 7a.

The scanning method using the window 710 may performed by scanning the frame zigzag in a horizontal direction, as shown in the drawing, or scanning the frame zigzag in a vertical direction. The window 710 may advance in increments of one pixel or equal to the size of the window 710, which is preferably determined depending on the performance of the apparatus.

Furthermore, scanning may be performed only on a plurality of arbitrary regions or a region the frequency of which is expected to be highest, not the entire region of a frame.

Figure 7B:
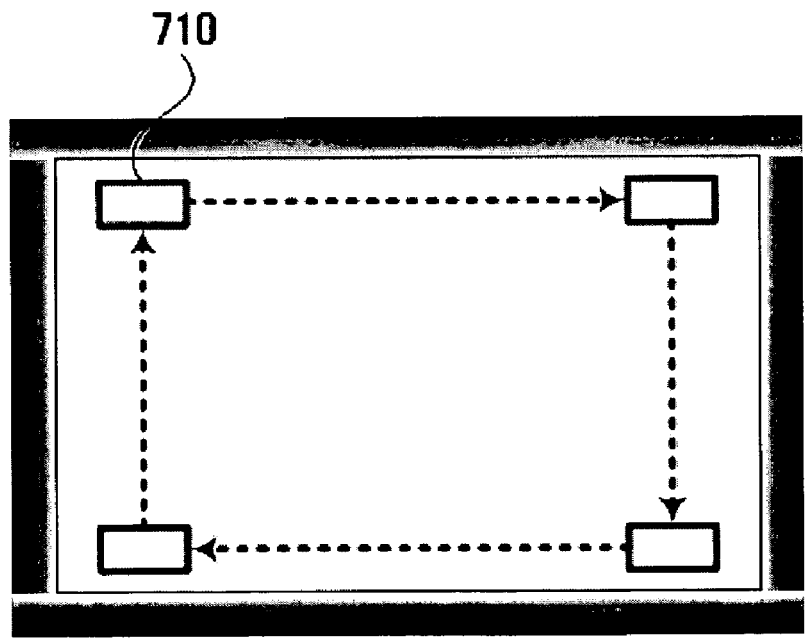
FIG. 7b is a diagram illustrating a process of scanning an arbitrary frame for the logo of a digital broadcasting station in accordance with an embodiment of the present invention.

FIG. 7b is a diagram illustrating a process of scanning an arbitrary frame for the logo of a digital broadcasting station in accordance with an embodiment of the present invention.

In general, a digital broadcasting station transmits a digital image to users' digital TVs while inserting the logo thereof into the digital image. In this case, the logo exists in the form of part of the image, not text information. The aspect ratio can be extracted by making an image analysis of that part.

In that case, the logo is commonly located in a corner of a screen. Operation time can be reduced by applying scanning using the window 710 of FIG. 7b only to the corners of the frame, not the entire frame.

Furthermore, there are cases where the logos of digital broadcasting stations indicated in conjunction with pure HD-grade digital broadcast content are converted into images while including the characters "HD". Accordingly, when pattern recognition is performed on a region where the logo is located and the pattern "HD" is recognized, broadcast content in question can be determined to be HD-grade broadcast content.

Figure 8:
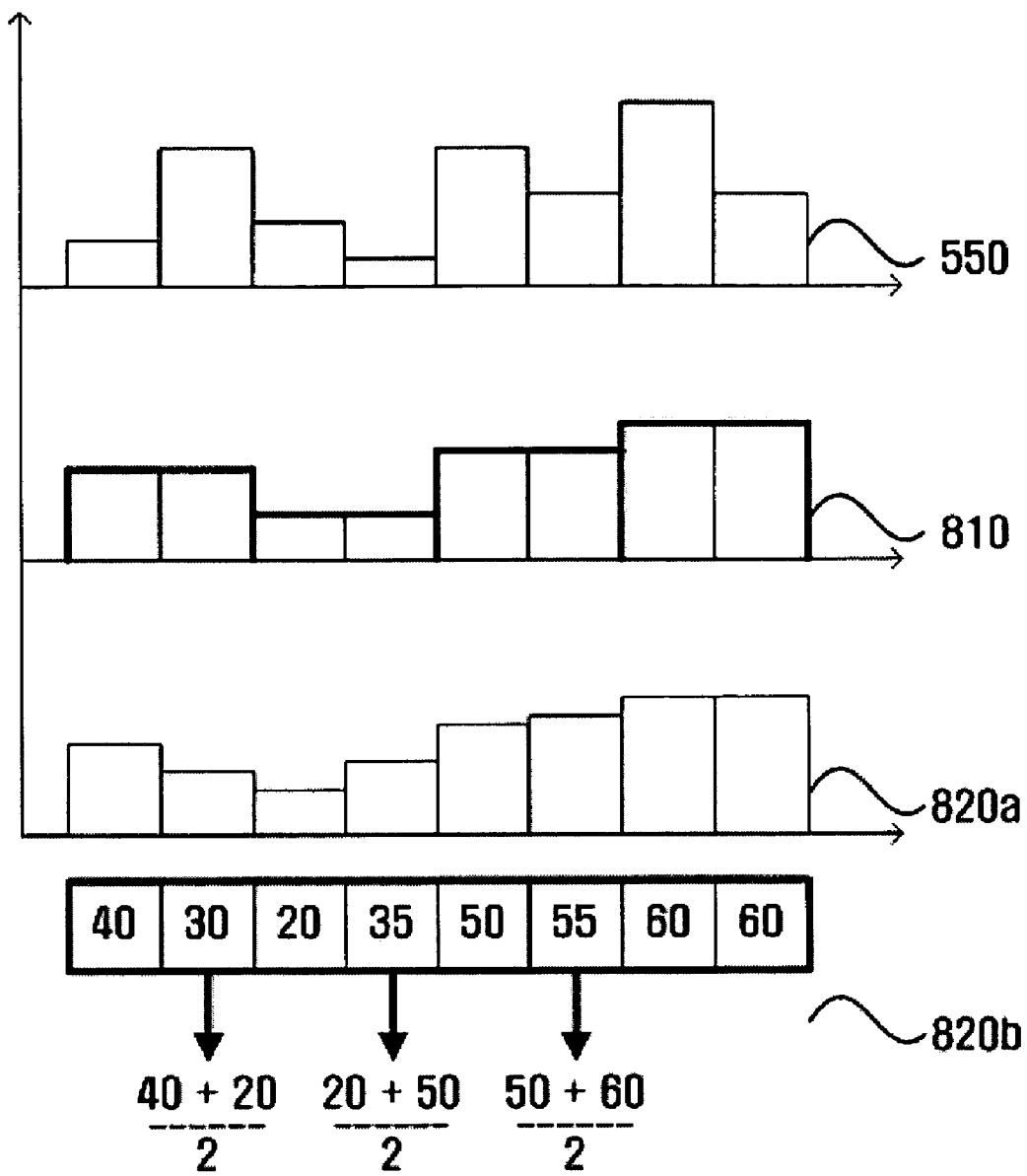
FIG. 8 is a diagram illustrating a process of extracting the aspect ratio of received broadcast content in accordance with another embodiment of the present invention.

FIG. 8 is a diagram illustrating a process of extracting the aspect ratio of received broadcast content in accordance with another embodiment of the present invention.

Although there are a variety of digital image interpolation methods, it is difficult for the operation performance of digital image interpolation devices to support extended images at high efficiency, so that NNI and LI are generally employed.

Accordingly, in the present invention, the aspect ratio can be extracted using the above-described digital interpolation methods. The interpolation method 810 using NNI is performed in such a way as to copy pixels and insert them between adjacent pixels as illustrated in the drawing, so that pixels having the same value exist near each other. The interpolation method 820*a* using LI is performed in such a way as to insert the average values of adjacent pixels between the pixels, so that the aspect ratio can be determined by extracting the average values of the adjacent pixels (refer to 820*b*).

In other words, the combined use of the detection of the frequency of a specific region and the detection of the characteristic of an interpolation method can improve accuracy in the detection of the aspect ratio.

In accordance with the apparatus and method for extracting the aspect ratio of received broadcast content according to the present invention, one or more of the following effects can be achieved.

First, the present invention has the advantage of eliminating the inconvenience of frequently adjusting an aspect ratio because the aspect ratio can be extracted in such a way as to analyze the frequency of the image of broadcast content received from a digital broadcasting station and compare the analyzed frequency with a preset threshold value, or to analyze specific characters that is located in the specific region of the image of received broadcast content and is represented in an image.

Second, the present invention has the advantage of improving accuracy in the extraction of an aspect ratio in such a way as to store a method of extracting an aspect ratio for a specific channel and compare the stored aspect ratio extraction method with a new aspect ratio extraction method when the channel is selected again.

Although these exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for extracting an aspect ratio of received digital content, the apparatus comprising:
    an image reception unit configured to receive a digital image;
    a frequency detection unit configured to detect a frequency of a predetermined region of a frame of the digital image;
    a determination unit configured to determine an aspect ratio of the digital image by comparing the detected frequency with a predetermined threshold value; and
    an output unit configured to output the aspect ratio of the received digital image based on a result of the determination.

2. The apparatus as set forth in claim 1, wherein the frequency detection unit detects the frequency by accumulating edge detection values of the predetermined region.

3. The apparatus as set forth in claim 2, wherein the frequency detection unit detects the frequency at predetermined intervals.

4. The apparatus as set forth in claim 1, wherein the predetermined region of the frame is a portion of the frame having the highest frequency.

5. The apparatus as set forth in claim 1, wherein the aspect ratio, that is, a ratio of a width of the digital image to a height thereof, is at least one of 4:3 and 16:9.

6. The apparatus as set forth in claim 1, further comprising a display unit for displaying the digital image in conformity with the output aspect ratio.

7. A method of extracting an aspect ratio of received digital content, the method comprising:
    receiving a digital image;
    detecting a frequency of a predetermined region of a frame of the digital image;
    determining the aspect ratio of the digital image by comparing the detected frequency with a predetermined threshold value; and
    outputting the aspect ratio of the digital image based on a result of the determination.

8. The method as set forth in claim 7, wherein the detecting the frequency comprises detecting the frequency by accumulating edge detection values of the predetermined region.

9. The method as set forth in claim 8, wherein the detecting the frequency is the detecting the frequency at predetermined intervals.

10. The method as set forth in claim 7, wherein the region is a region that is selected through scanning of the frame and that has a highest frequency.

11. The method as set forth in claim 7, wherein the aspect ratio, that is, a ratio of a width of the digital image to a height thereof, is at least one of 4:3 and 16:9.

12. The method as set forth in claim 7, further comprising the displaying the digital image in conformity with the output aspect ratio.

13. An apparatus for extracting an aspect ratio of received digital content, the apparatus comprising:
    an image reception unit configured to receive a digital image and extracting a detection region from a frame of the digital image;
    a frequency detection unit configured to detect a frequency of the detection region;
    a determination unit configured to determine the aspect ratio of the digital image by comparing the detected frequency with a predetermined threshold value; and
    an output unit configured to output the aspect ratio of the received digital image based on a result of the determination.

14. The apparatus as set forth in claim 13, wherein the image reception unit extracts a detection region from edge portions of a frame from the digital image and the frequency detection unit detects the frequency by accumulating edge detection values of the detection region.

15. The apparatus as set forth in claim 13, wherein the image reception unit scans the frame and extracts a detection region from a portion having the highest frequency.

16. The apparatus set forth in claim 13, wherein the image reception unit scans the frame to detect a logo included in the digital image and the aspect ratio is determined based on the detected logo when a logo is detected.

17. A method of extracting an aspect ratio of received digital content, the method comprising:
    receiving a digital image;
    extracting a detection region from a frame of the received digital image,
    detecting a frequency of the detection region;
    determining the aspect ratio of the digital image by comparing the detected frequency with a predetermined threshold value; and
    outputting the aspect ratio of the digital image based on a result of the determination.

* * * * *